United States Patent
Roger et al.

(10) Patent No.: US 11,802,938 B2
(45) Date of Patent: Oct. 31, 2023

(54) PROCESSING RADAR SIGNALS

(71) Applicant: Infineon Technologies AG, Neubiberg (DE)

(72) Inventors: Andre Roger, Munich (DE); Markus Bichl, Feldkirchen-Westerham (DE); Farhan Bin Khalid, Munich (DE); Romain Ygnace, Brunnthal (DE)

(73) Assignee: Infineon Technologies AG, Neubiberg (DE)

( * ) Notice: Subject to any disclaimer, the term of this patent is extended or adjusted under 35 U.S.C. 154(b) by 28 days.

(21) Appl. No.: 17/072,365

(22) Filed: Oct. 16, 2020

(65) Prior Publication Data

US 2021/0116533 A1 Apr. 22, 2021

(30) Foreign Application Priority Data

Oct. 17, 2019 (DE) .................... 10 2019 128 073.7

(51) Int. Cl.
*G01S 7/02* (2006.01)
*G01S 7/35* (2006.01)

(52) U.S. Cl.
CPC ............. *G01S 7/023* (2013.01); *G01S 7/354* (2013.01); *G01S 7/356* (2021.05)

(58) Field of Classification Search
CPC .......... G01S 7/023; G01S 7/356; G01S 7/354; G01S 7/2883
USPC ...................................................... 342/196
See application file for complete search history.

(56) References Cited

U.S. PATENT DOCUMENTS

| | | | | |
|---|---|---|---|---|
| 3,871,577 A | * | 3/1975 | Avellar | G06F 17/142 708/404 |
| 4,553,213 A | * | 11/1985 | Hyatt | G11C 27/04 332/185 |
| 5,982,433 A | * | 11/1999 | Kim | H04N 19/186 375/E7.166 |
| 6,549,907 B1 | * | 4/2003 | Fayyad | G06F 16/2237 |
| 6,822,606 B2 | * | 11/2004 | Ponsford | G01S 7/2921 342/159 |

(Continued)

FOREIGN PATENT DOCUMENTS

| | | | | |
|---|---|---|---|---|
| CN | 1704768 A | * | 12/2005 | .......... G01S 13/345 |
| CN | 103186476 A | * | 7/2013 | .......... G06F 17/142 |

(Continued)

OTHER PUBLICATIONS

An Ultra-Area-Efficient 1024-Point In-Memory FFT Processor by Hasa Yantir for Micromachines Published Jul. 31, 2019 (Year: 2019).*

(Continued)

*Primary Examiner* — Vladimir Magloire
*Assistant Examiner* — Michael W Justice
(74) *Attorney, Agent, or Firm* — Eschweiler & Potashnik, LLC

(57) ABSTRACT

A radar device is provided that is arranged for conducting an interference detection and mitigation based on received and sampled radar signals and storing interference-mitigated data; conducting an FFT on the interference-mitigated data and storing FF-transformed data; conducting a compression on the FF-transformed data into compressed data; and storing the compressed data in a memory. Also, a method for operating such radar device is suggested.

12 Claims, 2 Drawing Sheets

(56) References Cited

U.S. PATENT DOCUMENTS

| | | | | |
|---|---|---|---|---|
| 7,092,582 | B2* | 8/2006 | Hier | G06T 3/4023 348/625 |
| 7,668,390 | B2* | 2/2010 | Hier | G06T 3/403 345/698 |
| 7,760,133 | B2* | 7/2010 | Shirai | G01S 13/931 342/146 |
| 8,718,153 | B2* | 5/2014 | Kim | H04L 27/263 708/405 |
| 10,222,470 | B2 | 3/2019 | Addison | |
| 10,330,773 | B2* | 6/2019 | Rao | G01S 13/42 |
| 10,451,723 | B2* | 10/2019 | Chiu | G01S 7/354 |
| 2001/0030585 | A1* | 10/2001 | Jansson | H03J 1/0008 333/132 |
| 2004/0178951 | A1* | 9/2004 | Ponsford | G01S 7/2921 342/194 |
| 2004/0227773 | A1* | 11/2004 | Hier | G06T 3/4023 345/690 |
| 2004/0234154 | A1* | 11/2004 | Hier | G06T 3/4023 382/254 |
| 2009/0121918 | A1* | 5/2009 | Shirai | G01S 7/023 342/159 |
| 2016/0033631 | A1 | 2/2016 | Searcy | |
| 2016/0131744 | A1* | 5/2016 | Addison | G01S 7/354 342/196 |
| 2016/0377711 | A1* | 12/2016 | Arage | G01S 13/26 342/118 |
| 2017/0363711 | A1* | 12/2017 | Rao | H04B 15/02 |
| 2018/0045810 | A1* | 2/2018 | Ygnace | G01S 7/288 |
| 2018/0172816 | A1* | 6/2018 | Chiu | G01S 13/26 |

FOREIGN PATENT DOCUMENTS

| | | | | |
|---|---|---|---|---|
| DE | 19730437 | A1 * | 1/1999 | G01S 13/53 |
| DE | 102014116452 | A1 | 5/2016 | |
| EP | 3244229 | A1 | 11/2017 | |
| JP | H0943343 | A * | 10/1996 | G01S 13/53 |
| JP | 2010230519 | A * | 10/2010 | |
| JP | 2018163090 | * | 3/2017 | G01S 7/285 |

OTHER PUBLICATIONS

Memory Bandwidth Efficient Two-Dimensional Fast Fourier Transform Algorithm and Implementation for Large Problem Sized by Berkin Akin for Carnegie Mellon University, Pittsburgh PA. Wayback Machine Date of Jul. 21, 2018 (Year: 2018).*

Reduced Memory Architecture for CORDIC-based FFT by Xin Xiao for Illinois Institute of Technology Chicago, IL. Copyright 2010 IEEE. (Year: 2010).*

Lecture 2 The CPU, Instruction Fetch & Execute. Note this reference is for inherency purposes. Dec. 7, 2015 (Year: 2015).*

CE1911 Lababoratory Note this Reference is for inherency purposes. (Year: 2022).*

Bechter, Jonathan et al.; "Automotive Radar Interference Mitigation by Reconstruction and Cancellation of Interference Component"; Institute of Microwave Techniques, University of Ulm, Germany, 2015.

* cited by examiner

PROCESSING RADAR SIGNALS

REFERENCE TO RELATED APPLICATION

This application claims priority to German Application No. 10 2019 128 073.7, filed on Oct. 17, 2019, the contents of which are hereby incorporated by reference in their entirety.

FIELD

Embodiments of the present disclosure relate to radar applications, in particular, to an efficient way to process radar signals obtained by at least one radar sensor, e.g., via at least one antenna. Processing radar signals in this regard in particular refers to radar signals received by a sensor or an antenna.

BACKGROUND

Several radar variants are used in cars for various applications. For example, radar can be used for blind spot detection (parking assistant, pedestrian protection, cross traffic), collision mitigation, lane change assist and adaptive cruise control. Numerous use case scenarios for radar appliances may be directed to different directions (e.g., back, side, front), varying angles (e.g., azimuth direction angle) and/or different distances (short, medium or long range). For example, an adaptive cruise control may utilize an azimuth direction angle amounting to ±18 degrees, the radar signal is emitted from the front of the car, which allows a detection range up to several hundred meters.

A radar source emits a signal and a sensor detects a returned signal. A frequency shift between the emitted signal and the detected signal (based on, e.g., a moving car emitting the radar signal) can be used to obtain information based on the reflection of the emitted signal. Front-end processing of the signal obtained by the sensor may comprise a Fast Fourier Transform (FFT), which may result in a signal spectrum, i.e. a signal distributed across the frequency. The amplitude of the signal may indicate an amount of echo, wherein a peak may represent a target that needs to be detected and used for further processing, e.g., adjust the speed of the car based on another car travelling in front.

A radar processing device may provide different types of outputs, e.g., a command to a control unit, an object or an object list to be post-processed by at least one control unit, at least one FFT peak to be post-processed by at least one control unit. Utilizing FFT peaks enables high performance post processing.

Constant false alarm rejection (CFAR), also referred to as constant false alarm rate, is in particular known as a threshold method for FFT result analysis which may be based on a signal power. CFAR allows adapting a threshold to decide whether the FFT signal indicates a potential target. CFAR in particular considers background noise, clutter and interference. Several CFAR algorithms are known. For details, reference is made to http://en.wikipedia.org/wiki/Constant-_false_alarm_rate.

US 2016 0033631 A1 describes radar data compression that reduces the amount of data that needs to be accumulated between a Range FFT and a Doppler FFT in a radar system using a Fast Chirp Waveform.

Interference detection and mitigation may advantageously enable an automotive radar to keep operational even when interfered by external equipment or by other (external) automotive radar applications.

SUMMARY

The present disclosure improves existing solutions and in particular efficiently processes signals in a radar system that may eventually lead to an improved target recognition.

The examples suggested herein may in particular be based on at least one of the following solutions. In particular combinations of the following features could be utilized in order to reach a desired result. The features of the method could be combined with any feature(s) of the device, apparatus or system or vice versa.

A radar device is disclosed that comprises one or more processing circuitry configured to:
 conduct an interference detection and mitigation based on received and sampled radar signals and storing interference-mitigated data;
 conduct an FFT on the interference-mitigated data and storing FF-transformed data;
 conduct a compression on the FF-transformed data into compressed data; and
 store the compressed data in a memory.

It is noted that FF-transformed data are data which have been transformed by an FFT, i.e. the outcome of the FFT.

It is further noted that the FFT may be a normal FFT or an inverse FFT (iFFT).

In one embodiment the memory may be an external memory to store the compressed data in a format known as a radar data cube. The size of the external memory may be in the order of millions of bytes of multiples thereof.

The solutions described herein may be applicable for phase or frequency modulation continuous wave radar solutions (i.e. PMCW or FMCW radar solutions). In case of PMCW solutions, the first stage FFT is a Doppler FFT and in case of FMCW solutions, the first stage FFT is a range FFT.

According to an embodiment, the interference-mitigated data and/or the FF-transformed data are stored in at least one temporary storage.

The at least temporary storage may be realized as or it may comprise at least one Random Access Memory (RAM). In one embodiment the size of the temporary storage may be in the order of tens of kilobytes.

According to an embodiment, the temporary storage comprises at least one register or at least one buffer.

According to an embodiment, the temporary storage is at least one magnitude smaller than the memory in which the compressed data are stored.

According to an embodiment, the interference-mitigated data are stored in a first temporary storage and the FF-transformed data are stored in a second temporary storage.

According to an embodiment, received radar signals are sampled and stored in an additional temporary storage, which is accessed when conducting the interference detection and mitigation.

According to an embodiment, the FFT is a first stage FFT.

According to an embodiment, the FF-transformed data are stored in at least two memories in an alternating manner and the compression of the FF-transformed data are conducted by accessing the at least two memories such that the FF-transformed data are read from the memory of the at least two memories which is currently not being used by storing the FF-transformed data.

According to an embodiment, the FF-transformed data and the compressed data are floating point data.

Also, a vehicle is disclosed comprising at least one device as described herein.

Further, a method is disclosed for processing radar signals, the method comprising:

conducting an interference detection and mitigation based on received and sampled radar signals and storing interference-mitigated data;

conducting an FFT on the interference-mitigated data and storing FF-transformed data;

conducting a compression on the FF-transformed data into compressed data; and storing the compressed data in a memory.

In addition, a non-transitory computer program product is provided that is loadable into a memory of a digital processing device, comprising software code portions for performing the steps of the method as described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Figure 1:
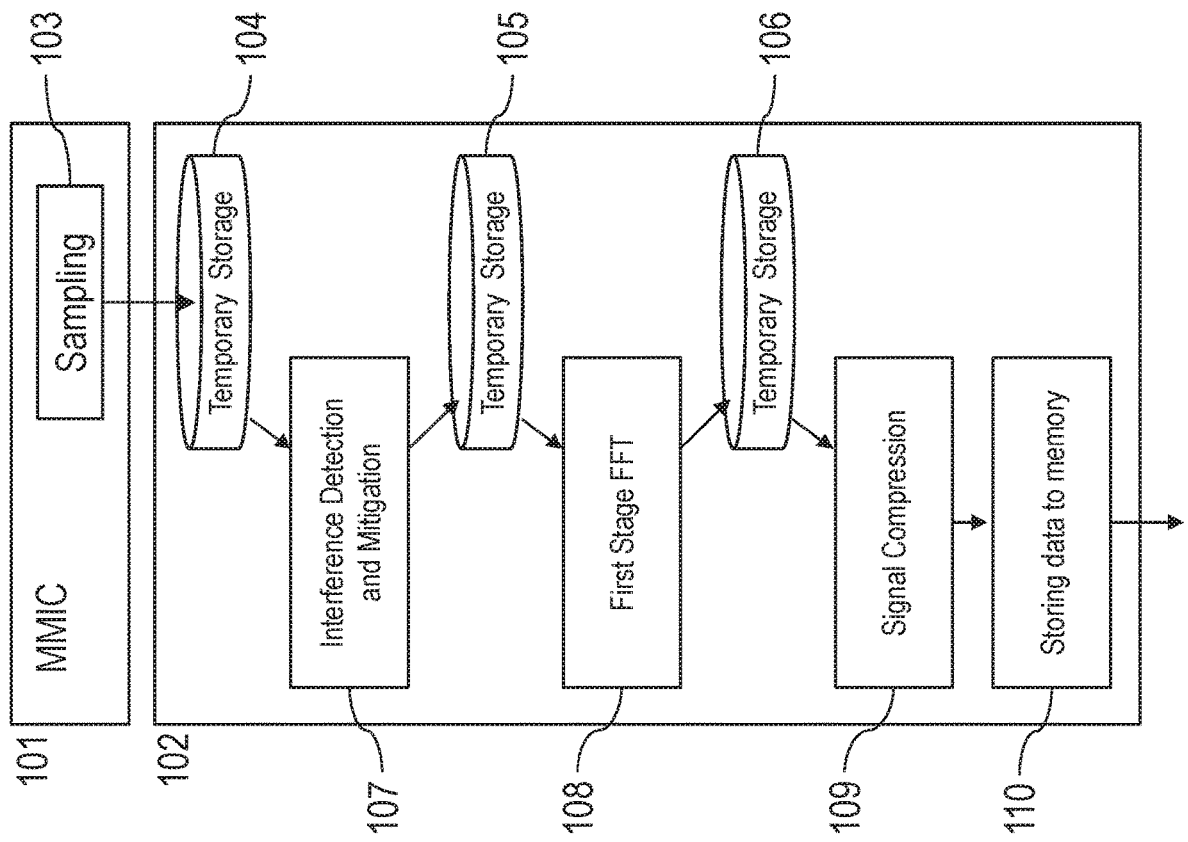
FIG. 1 shows a schematic diagram visualizing several steps that may be conducted by a processing part of a radar device.

The approach described herein may utilize at least one of various known signal compression methods. Compressing data in particular before it is stored in a memory bears the advantage that less memory may suffice, which may improve the cost efficiency of the device.

It is also a general objective to efficiently reduce the negative impact on any interference that stems from a radar signal.

Hence, it is a disadvantage that interfering radar signals may result in an acquired signal that shows an amplitude that is higher than the amplitude of a received signal without such interference. However, compressing the interfered signal with the higher amplitude may result in also storing unwanted interference information of the signal. This is in particular not efficient, because the signal without interference may have an overall lower amplitude and may therefore be compressed in a more efficient way. Basically, it would be an objective to store the original signal with a reduced portion of (or without) the interference.

Hence, interference mitigation is a processing step that can be used to reduce this unwanted interference portion in the received signal. Interference mitigation is described, e.g., in https://oparu.uni-ulm.de/xmlui/bitstream/handle/123456789/6650/bechter_2015.pdf?sequence=1&isAllowed=y or in http://radar.ewi.tudelft.nl/Publications/pdf/PID5228749_Pre_Print.pdf, and is hereby incorporated by reference in its entirety.

Examples described herein utilize an efficient combination of interference mitigation and compression of data that has been acquired by the radar device. It is noted that the radar device may be part of a radar system or the device may comprise the portions of the radar system.

Hence, it is an example solution to process radar signals utilizing a temporary storage prior to a first stage FFT being conducted. Such processing of radar signals before the first stage FFT may comprise an interference detection and mitigation functionality. Next, the processed radar signals may be compressed and stored in a (lager) radar memory, e.g., in a format known as radar data cube.

The radar data cube may provide an intuitive way to represent radar data as a function of space and time. The radar data cube may be perceived as a three-dimensional block with the radar returns of a single pulse represented along a first axis, returns from additional receiver elements along a second axis, and a collection of the returns from multiple pulses along a third axis (see, e.g., https://de.mathworks.com/company/newsletters/articles/building-and-processing-a-radar-data-cube.html).

Hence, examples described herein allow for a more efficient signal compression, because the data to be compressed have already been processed by the interference-mitigation function (or unit providing such function).

It is an option that interference mitigation, first stage FFT and data compression is done in a single pass using, e.g., a temporary storage, like registers and/or buffers. This bears the advantage that there is no need for a big external memory prior to storing the compressed data. In other words, only the compressed data may be stored in a more permanent way in, e.g., a large (external) memory. External in this regard means external to the temporary storage that may be associated with the processing devices conducting the interference mitigation, the first stage FFT and the signal compression.

The temporary storage may be a small memory comprising 32 Kbytes or multiples thereof. In contrast, the memory that is used for storing the compressed data may be in the order of millions of bytes of multiples thereof.

FIG. 1 shows a schematic diagram visualizing several steps that may be conducted by a processing part 102 of a radar device.

The radar device may also comprise a MMIC (Monolithic Microwave Integrated Circuit) 101 which conducts a sampling 103 of received signals. The sampled data are stored in a temporary storage 104. An interference detection and mitigation 107 is conducted based on the sampled data by accessing the temporary storage 104 and storing mitigation results in a temporary storage 105. Next, a first stage FFT 108 is conducted on the mitigation results and the transformed data are stored in a temporary storage 106. A signal compression 109 is conducted on the mitigated and FFT transformed data stored in the temporary storage 106. The compressed data are then stored into a memory as indicated in a step 110.

It is noted that the boxes 103, 107, 108, 109 and 110 in FIG. 1 may in particular visualize functionalities or steps to be conducted. Each such process step can be conducted via a dedicated piece of hardware. Also, at least one piece of hardware can be provided that is arranged to conduct at least one of the steps or functionalities 103 and 107 to 110.

It is further noted that the temporary storages 104 to 106 may be realized as at least one piece of physical memory, e.g., at least one register and/or at least one buffer. It is also an option that at least one of the temporary storages 104 to 106 may be part of the physical memory that is used in step 110 to store the compressed data.

The benefit of this solution is in particular that only a small (and, for example, fast) storage can be used as any of the temporary storages 104 to 106 in order to allow for a fast and efficient processing without having to persistently store the intermediary results. Only the optimized, i.e. interference-mitigated and FFT-transformed data are stored in a compressed manner in the memory for further processing.

Such further processing may comprise at least one additional FFT stage (e.g., second stage FFT, third stage FFT) to determine an acceleration of an object and/or an azimuth direction angle.

It is in particular an option that the steps 108 to 110 are conducted in a single pass.

It is a further option that the temporary storages 104 to 106 shown in FIG. 1 are realized as a single piece of temporary storage, which can at least partially be re-used in at least one of the steps 107 to 109. subsequent processing step.

Figure 2:
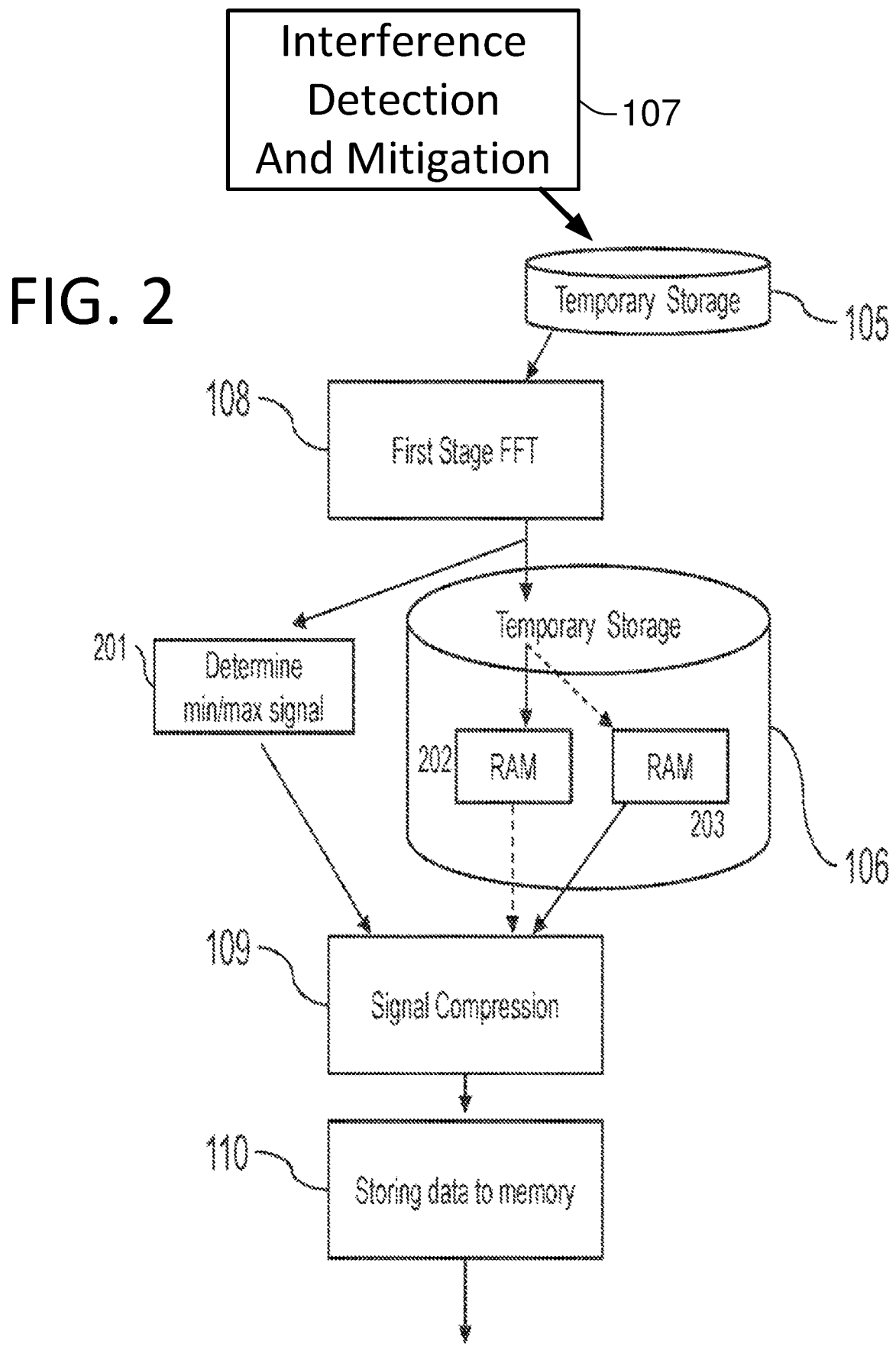
FIG. 2 shows a portion of the processing part 102 of FIG. 1 in more detail.

FIG. 2 shows a portion of the processing part 102 of FIG. 1 in more detail. The results determined by the first stage FFT 108 are stored in the temporary storage 106 by using two memories 202 and 203 in an alternating manner as follows: A first FFT result determined by the first stage FFT 108 is stored in the memory 202. The next FFT result determined by the first stage FFT 108 is stored in the memory 203. During this time, the first FFT result may be read by the signal compression 109 from the memory 202, be compressed and stored in the memory (step 110). The subsequent FFT result determined by the first stage FFT 108 is—again—stored in the memory 202 while the second FFT result can be read from the memory 203 by the signal compression 109, be compressed and stored to the memory (step 110).

The memories 202 and 203 may be Random Access Memories (RAMs). They may be part of at least one physical memory.

Also, for each of a predetermined selection of FFT results determined by the first stage FFT 108, a minimum and a maximum signal are determined (indicated by a function 201), which are used by the signal compression 109 to efficiently compress the data based on a min-max-range thereby determining and utilizing at least one compression parameter.

It is noted that the function 201 may be realized as a processing step that may be conducted by the first stage FFT 108 or by the signal compression 109. Also, the function 201 may be realized in a component of its own.

In FIG. 2, the first stage FFT may be any FFT accelerator.

It is also an option that storing data to the memory as indicated in box 110 may utilize a DMA access towards the memory.

It is an option that block floating point is used as a data format. Such data format can utilize the minimum and maximum signals to efficiently determine an exponent for the compressed data. It is an option that floating point or block floating point are used as data format. Floating point format gives more flexibility to detect maximum and minimum signal amplitude by comparing only the exponent or by comparing both exponent and mantissa. The minimum and maximum signals are then used to efficiently determine an exponent for the compressed data.

It is another option that the signal compression 109 first writes compression parameters to the output DMA and then the compressed data. This allows for a decompression to first read the compression parameters before obtaining data. Hence, the compression parameters can be efficiently utilized during decompression.

Hence, examples described herein allow removing or reducing an unwanted high amplitude in received radar signals, wherein such unwanted high amplitude is based on interference between radar signals. The interference mitigated data may then be FF-transformed and compressed.

The compressed data are efficiently stored in the memory for further radar (post) processing purposes. Utilizing temporary storages for conducting the interference mitigation, the FFT and the compression reduces the amount of hardware required.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various example embodiments of the disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A radar device comprising one or more processing circuitry configured to:
conduct an interference detection and mitigation operation on received and sampled radar signals to generate interference-mitigated data, and store the interference-mitigated data in a first temporary storage;
retrieve the interference-mitigated data from the first temporary storage and conduct a fast Fourier Transform (FFT) on the retrieved interference-mitigated data to form FFT-transformed data, and store the FFT-transformed data in a second temporary storage;
retrieve the FFT-transformed data from the second temporary storage and conduct a compression operation on the retrieved FFT-transformed data to form compressed data, wherein the second temporary storage comprises at least two memories, and wherein the FFT-transformed data are stored sequentially in the at least two memories in an alternating manner and the compression of the FFT-transformed data are conducted by accessing the at least two memories such that the FFT-transformed data are read from the memory of the at least two memories which is currently not being used for storing the FFT-transformed data; and
store the compressed data in a memory,
wherein the one or more processing circuitry further comprises a min/max circuit configured to determine a minimum signal, a maximum signal, and a min-max-range based on the minimum signal and the maximum signal based on the FFT-transformed data, and
wherein the one or more processing circuitry is further configured to employ the minimum signal and the maximum signal and the min-max-range with the FFT-transformed data in the compression operation.

2. The radar device according to claim 1, wherein the first temporary storage and the second temporary storage comprise at least one register or at least one buffer.

3. The radar device according to claim 1, wherein the first temporary storage and the second temporary storage are at least one order of magnitude smaller than the memory in which the compressed data are stored.

4. The radar device according to claim 1, wherein the first temporary storage and the second temporary storage are different.

5. The radar device according to claim 1, wherein the FFT is a first stage FFT.

6. The radar device according to claim 1, wherein the FFT-transformed data and the compressed data are floating point data.

7. The radar device of claim 1, wherein the min/max circuit comprises a hardware circuit that is separate and distinct from at least one other element of the one or more processing circuitry.

8. The radar device of claim 7, wherein the one or more processing circuitry further comprises an FFT accelerator circuit configured to generate the FFT-transformed data and pass successive results concurrently to both the min/max circuit and to alternative ones of the at least two memories of the second temporary storage.

9. The radar device of claim 8, wherein the one or more processing circuitry further comprises a signal compression circuit configured to receive respective FFT-transformed data from alternate ones of the at least two memories and the respective minimum signal and maximum signal from the min/max circuit and use both to conduct the compression operation.

10. A method for processing radar signals, comprising:
conducting an interference detection and mitigation operation using one or more processing circuitry on received and sampled radar signals to form interference-mitigated data, and storing the interference-mitigated data in a first temporary storage;
retrieving the interference-mitigated data from the first temporary storage and conducting an FFT on the interference-mitigated data to form FFT-transformed data using an FFT accelerator circuit of the one or more processing circuitry, and storing the FFT-transformed data in a second temporary storage;
determining, using a min/max circuit of the one or more processing circuitry, a minimum signal, a maximum signal, and a min-max range based on the minimum signal and the maximum signal from the FFT-transformed data concurrently with the storing of the FFT-transformed data in alternate ones of at least two memories of the second temporary storage;
retrieving the FFT-transformed data from the second temporary storage and conducting a compression operation on the FFT-transformed data to form compressed data using a compression circuit of the one or more processing circuitry,
wherein the second temporary storage comprises at least two memories, and wherein storing the FFT-transformed data in the second temporary storage comprises storing the FFT-transformed data sequentially in the at least two memories in an alternating manner, and
wherein retrieving the FFT-transformed data from the second temporary storage and conducting a compression operation on the FFT-transformed data to form compressed data comprises accessing the at least two memories such that the FFT-transformed data are read from the memory of the at least two memories which is currently not being used for storing the FFT-transformed data; and storing the compressed data in a memory.

11. A non-transitory computer program product loadable into a memory of a digital processing device, comprising software code portions for performing the acts of the method according to claim 10.

12. The method of claim 10, wherein retrieving the FFT-transformed data from the second temporary storage and conducting a compression operation on the FFT-transformed data to form compressed data comprises:

receiving concurrently the respective FFT-transformed data from alternate ones of the at least two memories and the respective minimum signal, the maximum signal, and the min-max range based on the minimum signal and the maximum signal from the min/max circuit at a compression circuit of the one or more processing circuitry, and using both to conduct the compression operation.

* * * * *